(12) United States Patent
Stabb et al.

(10) Patent No.: US 7,334,193 B2
(45) Date of Patent: Feb. 19, 2008

(54) START MENU USER TILES

(75) Inventors: Charles W. Stabb, Seattle, WA (US); David A. Matthews, Seattle, WA (US); Mark R. Ligameri, Snohomish, WA (US); Sterling M. Reasor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 11/034,717

(22) Filed: Jan. 14, 2005

(65) Prior Publication Data

US 2006/0161848 A1 Jul. 20, 2006

(51) Int. Cl.
*G06F 17/00* (2006.01)

(52) U.S. Cl. ............... 715/778; 715/779; 715/762; 715/764; 715/765

(58) Field of Classification Search ........ 715/762–765, 715/778–780, 809–810, 700–741
See application file for complete search history.

(56) References Cited

U.S. PATENT DOCUMENTS

| | | | | |
|---|---|---|---|---|
| 6,097,995 A | * | 8/2000 | Tipton et al. ............ | 700/266 |
| 6,757,821 B1 | * | 6/2004 | Akiyama et al. .......... | 713/100 |
| 6,807,666 B1 | * | 10/2004 | Evans et al. ............. | 718/108 |
| 2001/0015718 A1 | | 8/2001 | Hinckley et al. | |
| 2002/0038333 A1 | * | 3/2002 | Evans et al. ............. | 709/107 |
| 2001/0084276 | | 5/2003 | Levidow et al. | |
| 2003/0182586 A1 | * | 9/2003 | Numano ................. | 713/202 |
| 2004/0210662 A1 | * | 10/2004 | Lim et al. .............. | 709/229 |
| 2004/0225901 A1 | * | 11/2004 | Bear et al. ............. | 713/300 |

OTHER PUBLICATIONS

Quick ShutDown, the instant shutdown utility, pp. 1-4, Dec. 4, 2004.*
PCT Search Report, Application No. PCT/US05/30315, dated Jan. 24, 2006, 4 pages.

* cited by examiner

*Primary Examiner*—Tadesse Hailu
(74) *Attorney, Agent, or Firm*—Banner & Witcoff, Ltd.

(57) ABSTRACT

A user interface and a method for operating the user interface are described. Using the user interface, a user may readily switch between users without wading through cumbersome interfaces.

7 Claims, 4 Drawing Sheets

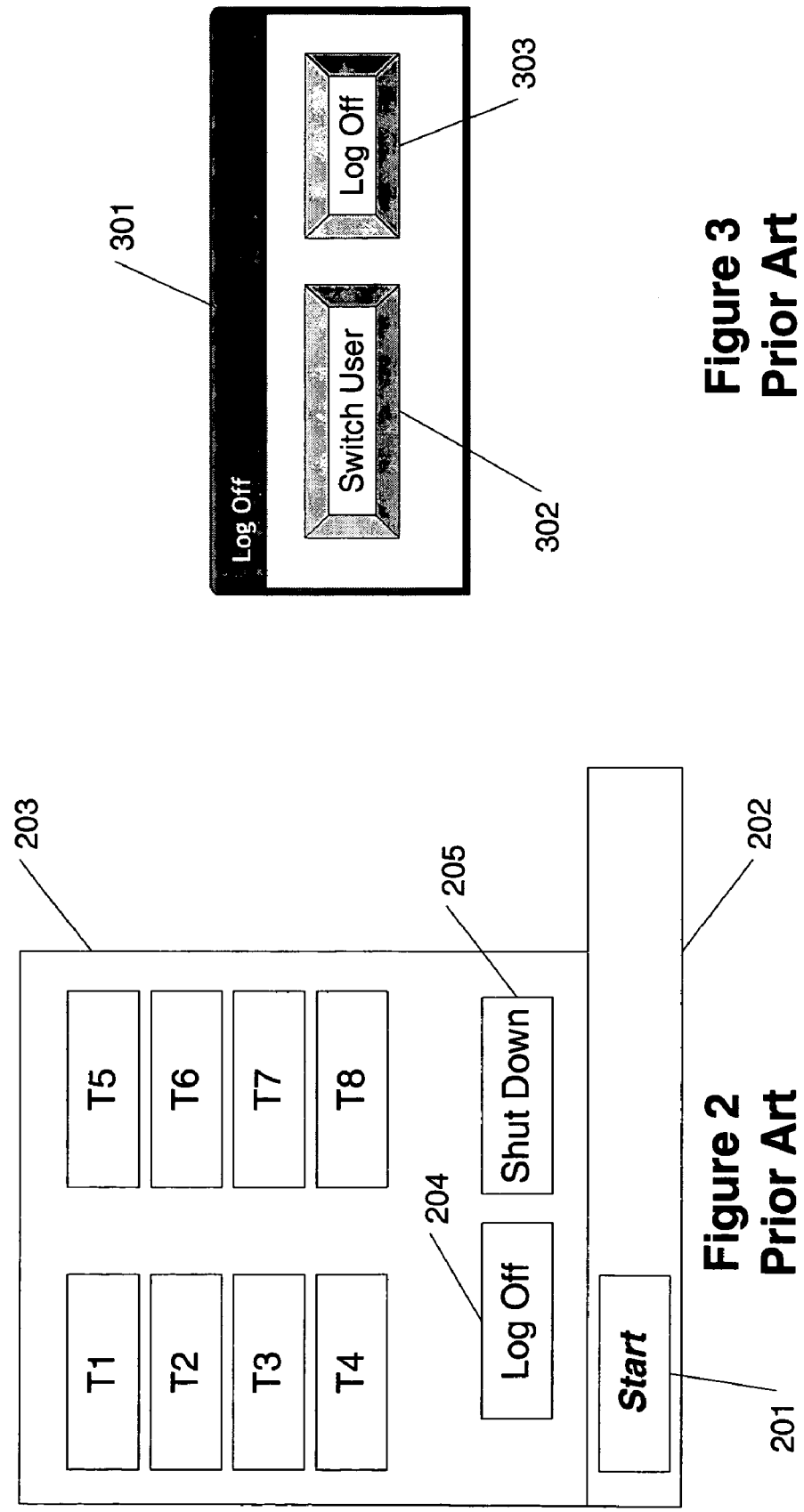

START MENU USER TILES

BACKGROUND OF THE INVENTION

1. Field of the Invention

Aspects of the present invention relate to computing systems. More particularly, aspects of the present invention relate to a user interface for switching between users.

2. Description of Related Art

The personal computer has become commonplace, both at work and at home. In the home setting, a single computer may be shared among family members. each family member may have his or her own personal account on the computer. When one person has finished using the computer and a second person desires to use it, the first person logs off or switches to the other user. Similarly, at work, a single machine may be shared between a number of users. Further, a single user may have two or more accounts with varying levels of privileges.

Though multiple accounts may exist on a computing system, one would expect that switching between the accounts would be easy. However, conventional approaches to switching between users do not provide a simple, intuitive interface. For example, FIG. 2 shows a conventional interface for switching between users. FIG. 2 includes a start menu button 201 in a task tray 202. After clicking on button 201, a user is provided with interface 203. Interface 203 includes a number of tiles relating to programs or folders as represented by tiles T1-T8. Also in user interface 203 are two buttons: log off button 204 and shut down button 205. Selecting log off button 204 results in another interface 301 asking whether the user desires to switch 302 between users or to log off 303 from the present user. Both buttons then take the user back to a log on screen from where the user selects a new user to log in.

A number of issues exist with this current interface. First, after selecting either button, the system takes a user to the same screen (or display). The user must remember if he or she remains logged on or has already logged off. Second, the number of clicks that are needed to perform the simple task of switching between known users is relatively complicated. Third, the buttons are not near each other. Stylus users are then relegated to completely moving their arms to the new interface. This results in gross movements of a user's arm while the user only wanted to perform a simple task.

An improved user interface for switching between users is needed.

BRIEF SUMMARY OF THE INVENTION

Aspects of the present invention address one or more of the problems described above, thereby providing a process for switching between users.

BRIEF DESCRIPTION OF THE DRAWINGS

The present invention is illustrated by way of example and not limited in the accompanying figures.

FIGS. 2-3 show conventional user interfaces for logging a user off a computer.

DETAILED DESCRIPTION OF THE INVENTION

Aspects of the present invention relate to a user interface and a method of operating a user interface to switch between users.

This document is divided into sections to assist the reader. These sections include: general-purpose computing environment, user interfaces, and processes for switching between users.

It is noted that various connections are set forth between elements in the following description. It is noted that these connections in general and, unless specified otherwise, may be direct or indirect and that this specification is not intended to be limiting in this respect.

General-Purpose Computing Environment

Figure 1:
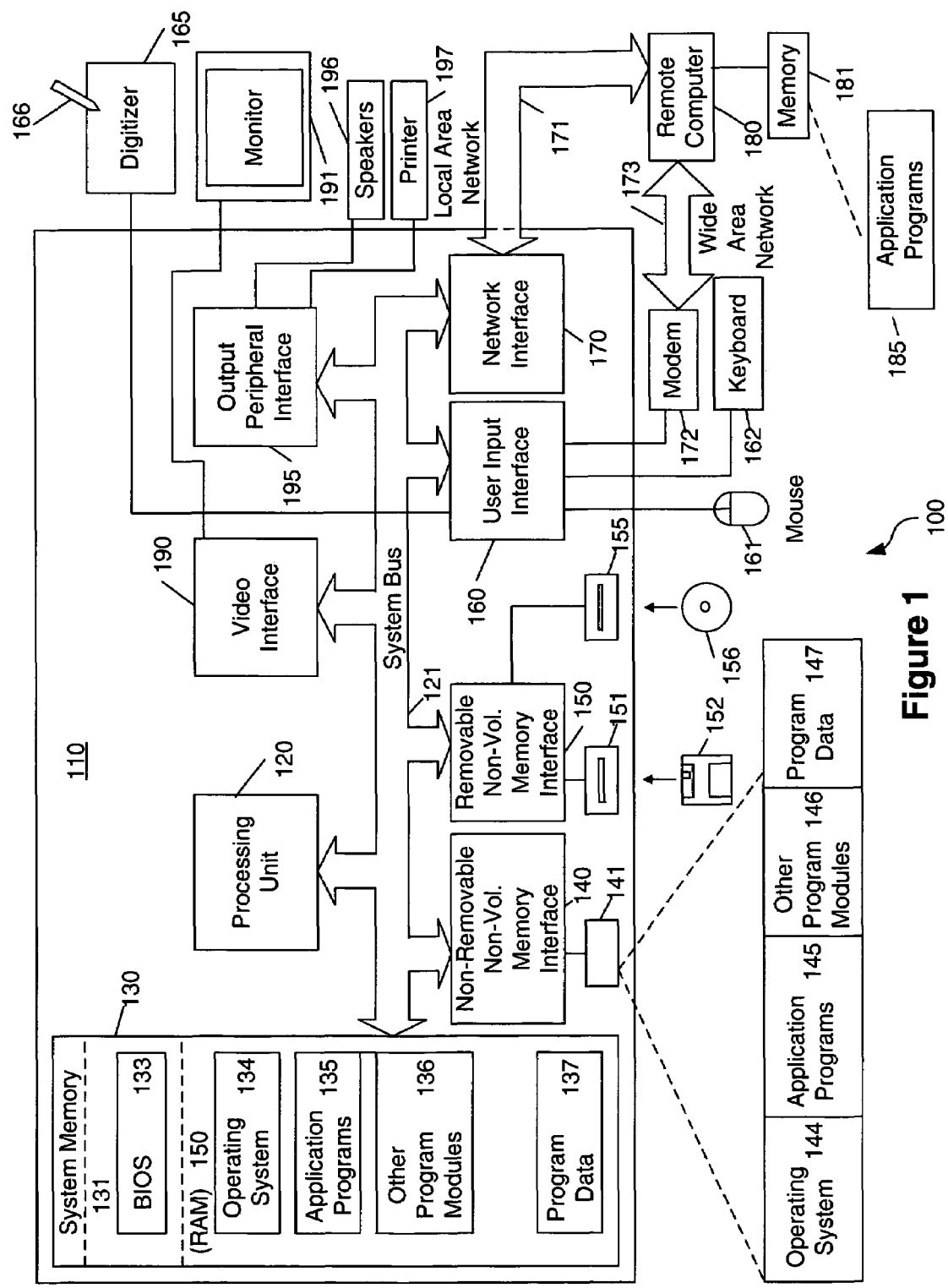
FIG. 1 shows an illustrative example of a general-purpose computing environment in accordance with aspects of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

User Interfaces

Figure 4:
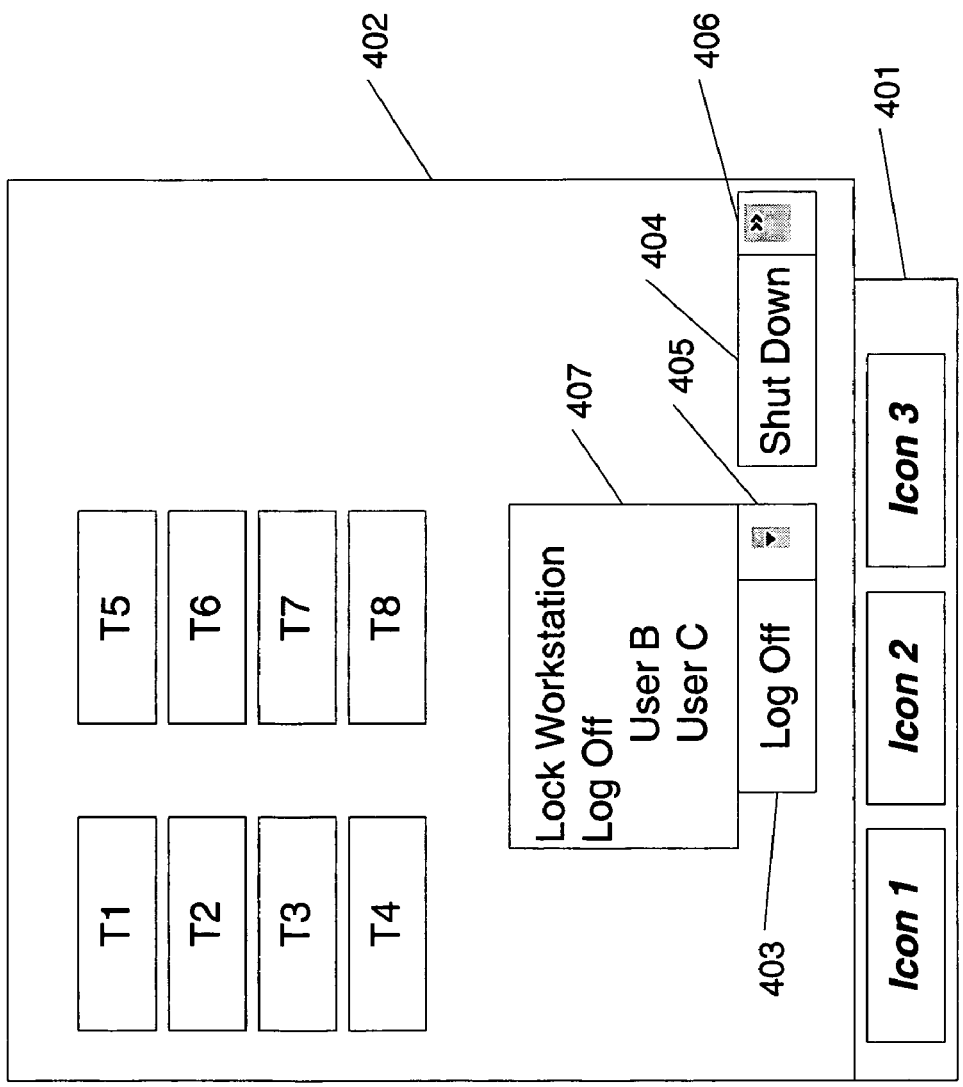
FIG. 4 shows a user interface in accordance with aspects of the present invention.

FIG. 4 shows a user interface in accordance with aspects of the present invention. FIG. 4 includes a region 401 with icons 1-3. Clicking on or hovering over one of the icons may cause region 402 to be displayed. Region 402 may include tiles T1-T8 of programs or folders or other objects. Region 402 may further include a log off button 403 and a shutdown button 404 with a menu expansion button 406 (that may provide various options including shut down, hibernate, standby or suspend, and the like).

The log off button 403 may include a primary region (403) and secondary region 405. The log off button may be a button that displays the phrase "log off" or other phrase. Also, the phrase may be user-defined or may be determined by the most recent previous activation of the tile or button 403. Alternatively, as some computing systems have user tiles that one may associate with the user during log on, the button or tile 403 may be a user tile so as to provide the user with an indication of which user is actively logged on.

Once activated (by clicking, for instance), the primary region 403 (or button or tile) may instruct the computing system to log off the user. This may return a user to a log in screen. If a password is present, a user may be presented with a keyboard or input region in which to input a password. It is appreciated that logging off the user may be a default action. Of course, other actions may be associated with the activation of tile 403. The action may be user defined or may be determined by the most recent previous activation of the tile or button 403.

Clicking or hovering over the secondary region (or hovering over the primary region) may invoke a menu 407. Alternatively, hovering may provide information on the function of the button at the cursor or stylus location. Menu 407 may include a number of options including locking the workstation, logging off, and switching users. For instance, selecting the lock workstation button may be to lock the work station, thereby requiring a password to regain access. Also, selecting the log off option logs off the user and presents a log in screen. Further, the user may be presented with the option to switch between users. Here, the system may display a list of available users on the system. This may be a complete list or may be a limited list (for instance, less than all available users).

The list of users may be sorted by user name. Alternatively, the list of users may be ordered by recent activities or selection by the user. For instance, if a user has logged in as User B more times than logging in as User C, the system may bubble the option for User B higher or lower. In a first aspect of the invention, the system may bubble the tile or choice for User B up showing a top-down ordering of the list (with the most recent choices nearer the top). Alternatively, in that larger, closer regions are easier to select than further, smaller regions, the system may bubble the tile or option for user B closer to the region or tile 403 so that the user does not need to move the mouse or stylus very far to select a most recent action.

The various users in region 407 may be displayed using different approaches. First, the users may be displayed with their name alone. Second, they may be displayed with a generic icon. Third, they may be displayed with a log-in tile that allows one to readily identify (graphically) which user may be selected.

If a user chooses another account, and that account does not have a password, then the user may be switched directly to that account. Alternatively, if a password does exist, then the user is taken to a login screen to enter a password or a user interface may be provided to receive a password before switching.

Processes For Switching Between Users

Figure 5:
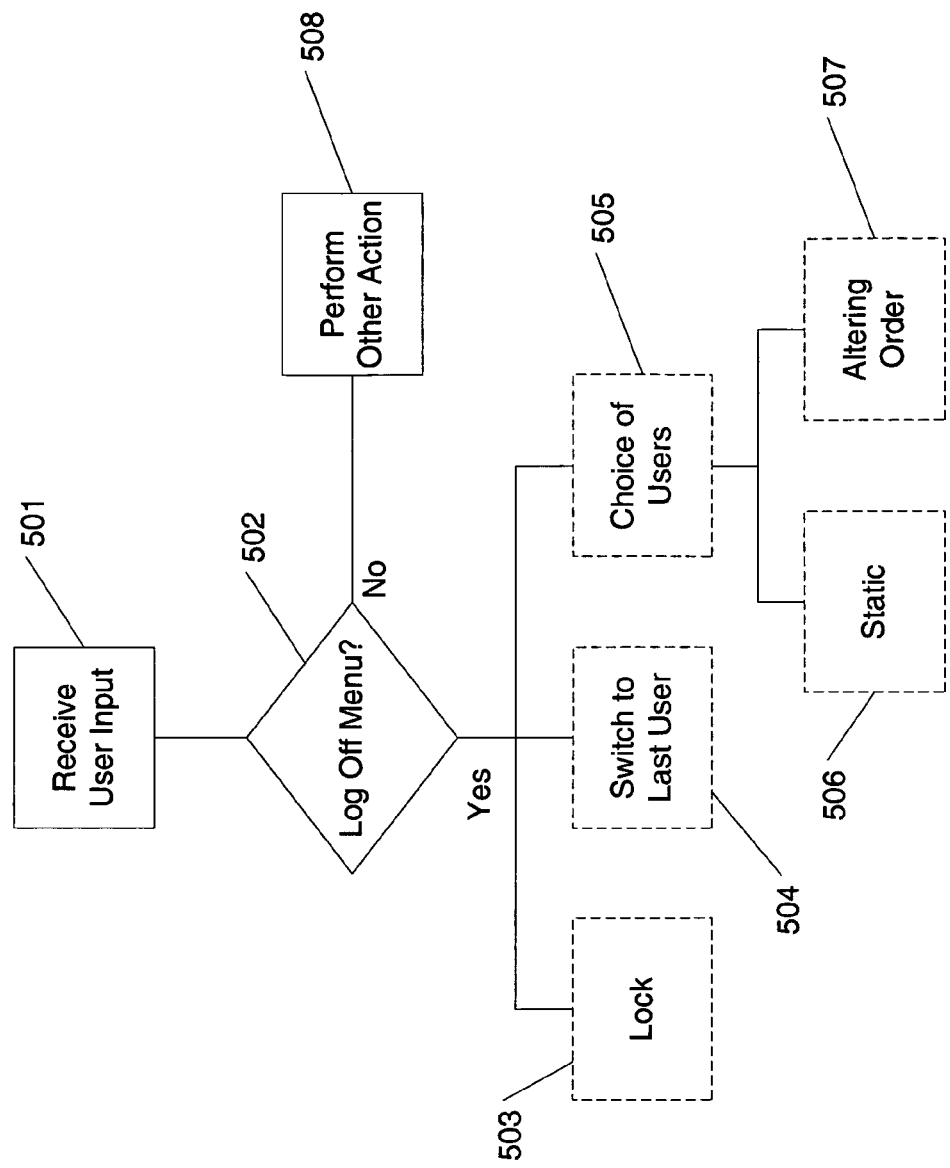
FIG. 5 shows a process with alternates for switching between users.

FIG. 5 shows a process for switching among choices with the following steps. In step 501, the system receives user input. In step 502, the system determines whether the user has accessed the log off menu. If no, then the system performs an action appropriate with the user input. If yes, then the system may perform a number of options based on the location of the input. First, as shown in step 503, the system may lock the system. As above, this may be a default action of the region 403 or may be an option in region 407. Alternatively, the input may be to switch to the last user as shown by step 504. Here, this may be a default action of region 403 or may be a frequent selection of the user. Further, as shown in step 505, the system may provide the user with a range of choices of users. For instance, the user may selection from a static list of users as shown in step 506 or may have chosen from a list in region 407. The altering order step 507 may be based on the user having selected one user and the system remember the choice (thereby altering the option's position in region 407).

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A user interface displayed on a computer screen for receiving user selection of logging off a system, said user interface comprising:
   a first region displaying a list of choices including logging off and shutting down a computer system;
   second region contained within said first region, said second region, upon activation, performing an action associated with logging off a user; and
   third region contained within said first region, said third region, upon activation, providing a list of menu choices relating to logging off of said computer system.

2. The user interface according to claim 1, wherein said second region includes locking the computer system.

3. The user interface according to claim 1, wherein said second region includes logging off said user and returning to a login screen.

4. The user interface according to claim 1, wherein said second region includes switching to another user.

5. The user interface according to claim 4, wherein said second region includes options to switch to more than one other user.

6. The user interface according to claim 5, wherein said options are fixed in order.

7. The user interface according to claim 5, wherein said options are variable based on previous user selections of said options.

* * * * *